United States Patent
Kasai et al.

(10) Patent No.: US 9,221,426 B2
(45) Date of Patent: Dec. 29, 2015

(54) AUTOMOBILE POWER SUPPLY CONTROL DEVICE

(75) Inventors: Yoshiyuki Kasai, Kasugai (JP); Tomoko Onoda, Kasugai (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 1427 days.

(21) Appl. No.: 12/604,091

(22) Filed: Oct. 22, 2009

(65) Prior Publication Data

US 2010/0100287 A1    Apr. 22, 2010

(30) Foreign Application Priority Data

Oct. 22, 2008 (JP) .................... 2008-271638

(51) Int. Cl.
  *G06F 19/00* (2011.01)
  *B60R 25/00* (2013.01)

(52) U.S. Cl.
  CPC ...................... *B60R 25/00* (2013.01)

(58) Field of Classification Search
  CPC ............ F02N 11/0803; F02N 11/0818; F02N 11/0822; F02N 11/08; F02N 11/0844; F02N 11/0862; F02N 11/0866; F02N 11/087; F02N 2011/0874; F02N 2011/0877
  USPC .......................................................... 701/48
  See application file for complete search history.

(56) References Cited

U.S. PATENT DOCUMENTS

2005/0132994 A1*  6/2005  Itou et al. ................... 123/179.3

FOREIGN PATENT DOCUMENTS

EP              901936 A1 *  3/1999
JP          2001-351453 A    12/2001

* cited by examiner

*Primary Examiner* — Mussa A Shaawat
*Assistant Examiner* — Kyung Kim
(74) *Attorney, Agent, or Firm* — Osha Liang LLP

(57) ABSTRACT

An automobile power supply control device for performing a control of switching a plurality of power supply circuits of a vehicle based on an operation of a push button type operation switch has a plurality of switching units for connecting the power supply circuits and a vehicle battery, and a control unit for performing a control of driving the switching units in a predetermined order according to number of operations of the operation switch. The control unit has a first detecting portion for detecting the operation of the operation switch, an output portion for outputting a drive command for driving the switching unit of next order when the first detecting portion detects the operation of the operation switch, and a second detecting portion for detecting the number of operations of the operation switch from a time point the drive command is output until a contact of the driven switching unit is switched. The switching units are driven in order by the number of operations detected by the second detecting portion, which driving is terminated when a last switching unit of the predetermined order is driven, or terminated when a first switching unit of the predetermined order is driven.

2 Claims, 4 Drawing Sheets

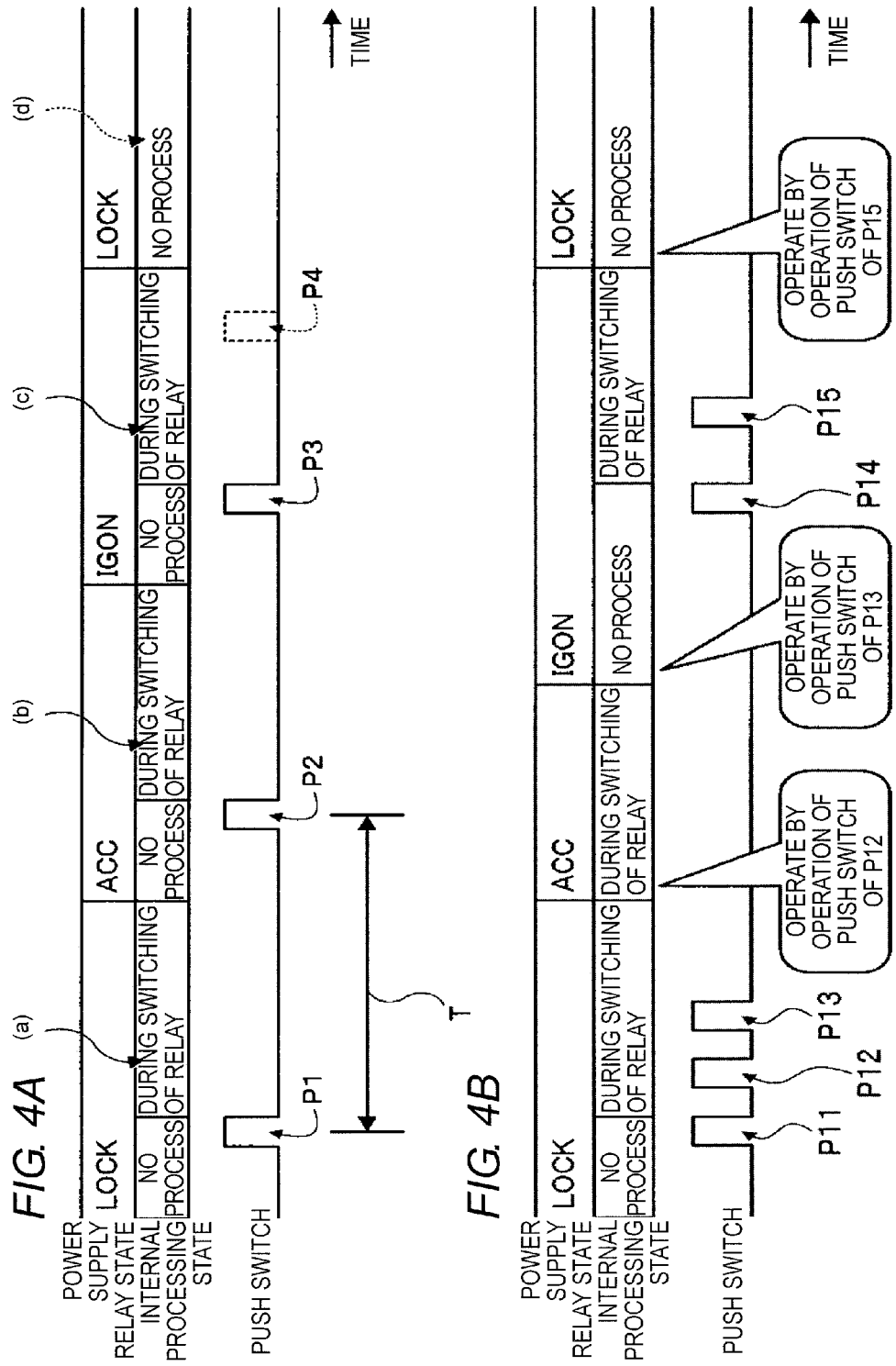

AUTOMOBILE POWER SUPPLY CONTROL DEVICE

BACKGROUND OF THE INVENTION

1. Technical Field

The present invention relates to automobile power supply control devices, more specifically, to a device for controlling power supply transition according to the operation of a switch in an automobile including a push button type operation switch.

2. Related Art

Historically reviewing the power supply transition of the automobile, only two transitions states with simply OFF (stop state of engine) and ON (operation state of engine) originally existed, but the ON state divided into two states of IGON (operation state of engine) and START (startup state of engine) according to the appearance of the electrical engine startup device (ignition motor), and now three transitions states "OFF", "IGON" and "START" exist. In the course of history, an "ACC" for enabling power ON of only electrical components is added between "OFF" and "IGON" according to the appearance of various types of electrical components (accessories) such as a radio, and nowadays, the majority of automobiles perform steering wheel lock and the like in the "OFF" state from the standpoint of security, whereby "OFF" is referred to as "LOCK" and four transitions states of "LOCK", "ACC", "IGON", and "START" are consequently provided.

Such power supply transition is entrusted on the operation of the driver, where a mechanical key type rotary switch has been widely used from the past for the operation unit, but an ignition device using an electronic key that can be simultaneously used with the mechanical key has appeared in recent years. In the electronic ignition device, authentication is wirelessly performed between an electronic key (portable device) held by the driver and an authentication unit 16 mounted on a vehicle to permit power supply transition such as engine startup. One of such ignition device includes an engine startup device equipped with a push button type operation switch (sometimes simply referred to as push switch) (see e.g., Japanese Unexamined Patent Publication No. 2001-351453).

In such engine startup device, a momentary type push switch is arranged, and the power supply transition state of the automobile is switched every time the push switch is pushed. Specifically, as described in paragraph of the relevant document, switch is sequentially made in the order of LOCK→ACC→IGON→START→LOCK every time the push switch is pushed.

SUMMARY

The technique of the prior art has an advantage in that the power supply transition state of the automobile can be switched with one touch without using a cumbersome mechanical key, but the push switch always needs to be operated in consideration of the correct number of times, and the push switch is sometimes operated by an inappropriate number of times in some cases. For instance, if the push switch, which is to be pushed three times to transition from the LOCK state to the START (engine startup) state, is switched four times by mistake, the engine again returns to the stop state (LOCK state) immediately after momentarily starting, which gives an uncomfortable feeling to the driver.

Furthermore, in the one-touch type engine startup device, a time lag caused by the operation delay of the electromagnetic relay and the like occurs to no small extent when transitioning from an arbitrary transition state to another transition state, and the driver may not patiently wait for such time lag and might mistakenly recognize "not transitioned to the intended transition state" and again operate the push switch even if the push switch is operated by a correct number of times, in which case, the state may transition to the involuntary transition state past the intended transition state.

One or more embodiments of the present invention provides an automobile power supply control device capable of appropriately performing power supply transition closer to the intention of the driver.

One or more embodiments of the present invention provides an automobile power supply control device for performing a control of switching a plurality of power supply circuits of a vehicle based on an operation of a push button type operation switch, the automobile power supply control device including: a plurality of switching units for connecting the power supply circuits and a vehicle battery; and a control unit for performing a control of driving the switching units in a predetermined order according to number of operations of the operation switch; the control unit includes: a first detecting portion for detecting the operation of the operation switch; an output portion for outputting a drive command for driving the switching unit of next order when the first detecting portion detects the operation of the operation switch; and a second detecting portion for detecting the number of operations of the operation switch from a time point the drive command is output until a contact of the driven switching unit is switched; wherein the switching units are driven in order by the number of operations detected by the second detecting portion, which driving is terminated when a last switching unit of the predetermined order is driven, or terminated when a first switching unit of the predetermined order is driven.

According to one or more embodiments of the present invention, a plurality of switching units connecting the power supply circuit and a vehicle battery are driven in order by the number of operations of the push button type operation switch, which driving is terminated when the last switching unit of a predetermined order is driven, or terminated when a first switching unit of a predetermined order is driven, and thus an involuntary power supply transition such as "LOCK→ACC→IGON" to "LOCK→ . . . ," or "IGON→LOCK" to "ACC→ . . . " do not occur. Therefore, an automobile power supply control device capable of appropriately performing the power supply transition closer to the intention of the driver can be provided.

BRIEF DESCRIPTION OF THE DRAWINGS

FIGS. 4A and 4B are conceptual explanatory views in one or more embodiments of the present invention.

DETAILED DESCRIPTION

Figure 1:
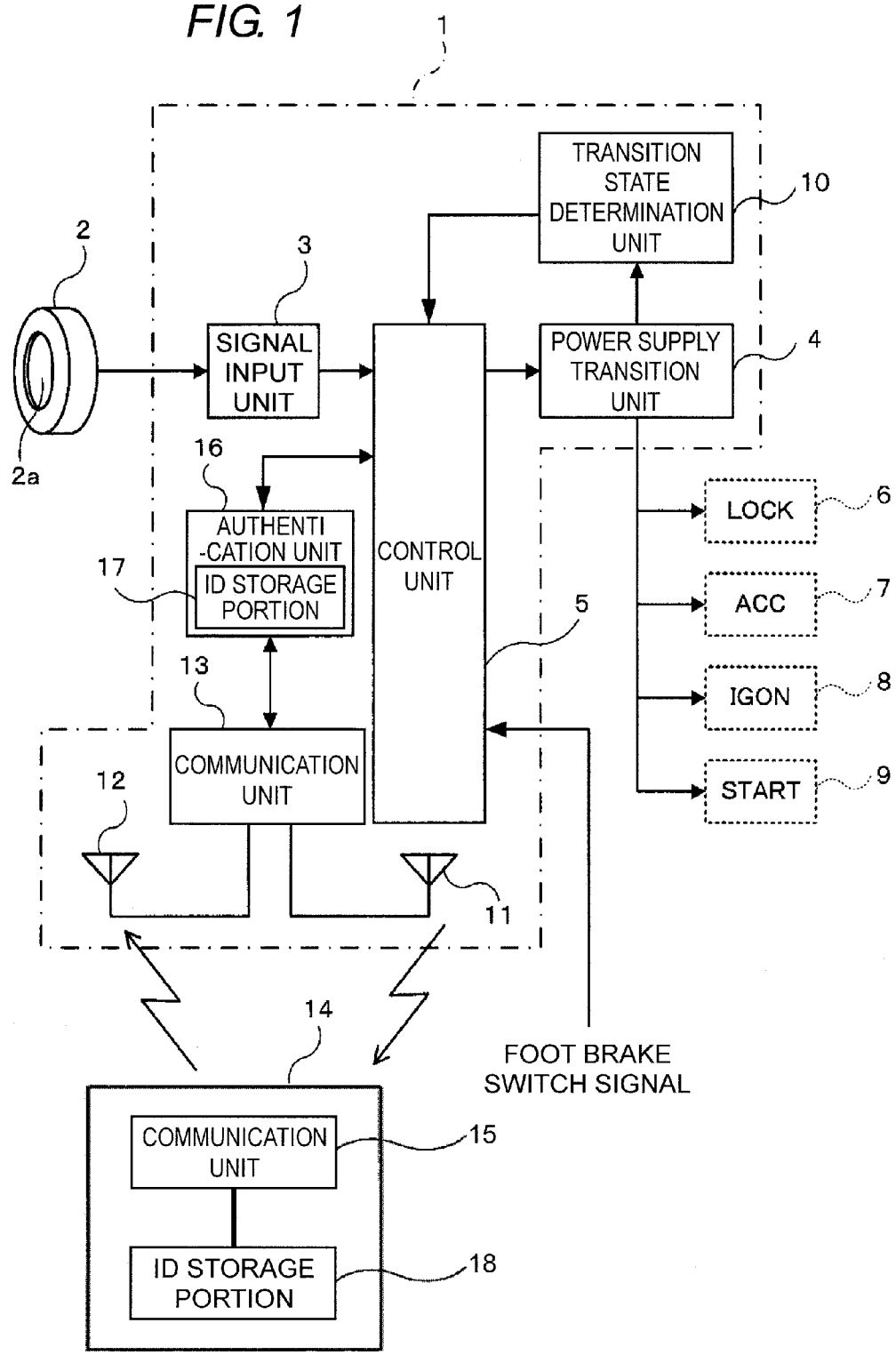
FIG. 1 is a schematic configuration diagram of an automobile power supply control device according to one or more embodiments of the present invention.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Hereinafter, preferred embodiments of the present invention will be described with reference to the drawings. FIG. 1 is a schematic configuration diagram of an automobile power supply control device according to one or more embodiments of the present invention. In the figure, an automobile power supply control device (hereinafter simply referred to as power supply control device) 1 includes a signal input unit 3 for shaping and retrieving a push signal from a momentary push button type engine startup switch (hereinafter referred to as push switch) 2, a control unit 5 configured by a control element (computer) of microprogram control method and the like for controlling a power supply transition operation of a power supply transition unit 4 based on the push signal retrieved through the signal input unit 3, the power supply transition unit 4 for individually driving a plurality of power supply transition elements (switching units) 6 to 9 mounted on the automobile according to a control instruction from the control unit 5, and a transition state determination unit 10 for determining a transition state (LOCK, ACC, IGON, START) of the power supply transition unit 4.

In addition, the power supply control device 1 also includes a communication unit 13 with a transmitter (not shown) and a transmission antenna 11 thereof for transmission at a very weak radio of LF band, as well as a receiver (not shown) and a reception antenna 12 thereof reception at a very weak radio of UHF band, and an authentication unit 16 for receiving matching information (hereinafter referred to as ID) returned from a communication unit 15 of a portable device 14 carried around by a passenger through the communication unit 13 according to the control instruction from the control unit 5, and performing authentication by matching such ID.

The authentication unit 16 and the portable device 14 respectively store matching information (ID) for authentication. ID storage portions 17, 18 in the figure are storage elements. Each ID stored in the ID storage portions 17, 18 may be the same, or may be different information associated in some manner.

The push switch 2 includes a push button 2a, where the contact is closed only while the driver is pushing such push button 2a. The push signal from the push switch 2 is retrieved from an input port of the control unit 5 as a waveform shaped signal through the signal input unit 3. The control unit 5 determines whether or not the push switch 2 has been operated by detecting change in rise and fall of the retrieved signal.

Here, each of a plurality of power supply transition elements 6 to 9 is LOCK relay 6, ACC relay 7, IGON relay 8, and START relay 9 for convenience using a general automobile by way of example, but the idea of the invention is not limited thereto. The power supply transition element may include other relays or may be other than relays. The power supply transition element merely needs be that which can be individually driven by the power supply transition unit 4.

Assuming each power supply transition element 6 to 9 is the LOCK relay 6, the ACC relay 7, the IGON relay 8, and the START relay 9, when the LOCK relay 6 is driven by the power supply transition unit 4, an actuator for locking the steering wheel and a battery are connected, so that the actuator is driven and the steering wheel is locked. When the ACC relay 7 is driven by the power supply transition unit 4, an accessory circuit of the vehicle and the battery are connected, so that power is supplied to the accessory circuit. When the IGON relay 8 is driven by the power supply transition unit 4, an ignition circuit of the vehicle and the battery are connected, so that power is supplied to the ignition circuit.

Figure 2:
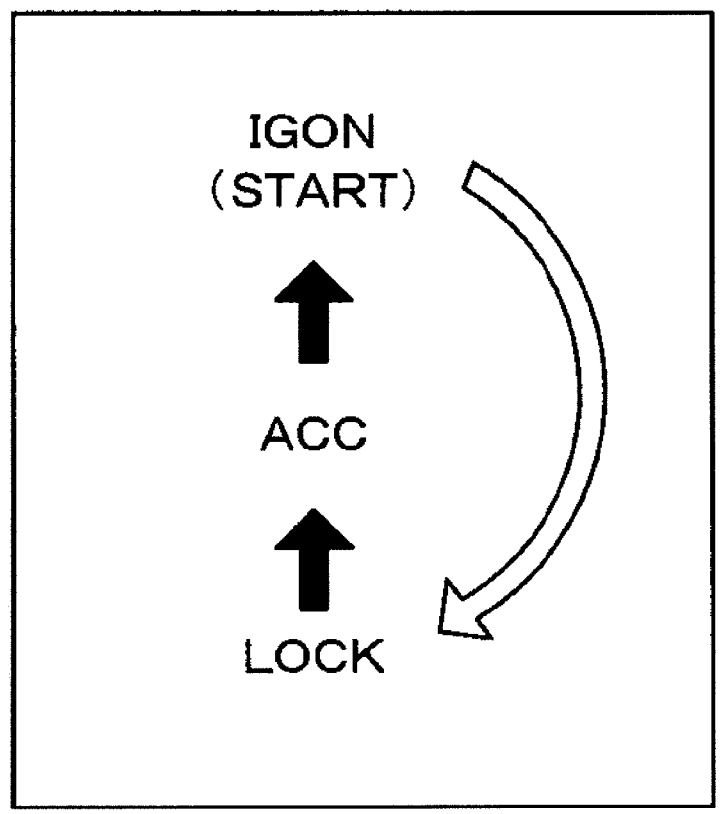
FIG. 2 is a schematic view showing a relationship of power supply transition states in one or more embodiments of the present invention.

FIG. 2 is a schematic view showing a relationship of the power supply transition states. In the figure, LOCK is a state in which the engine is stopped and the power is not supplied to the accessory circuit and the ignition circuit, and is also a transition state in which the steering wheel is locked and the automobile is not used. ACC is a transition state in which the power is supplied only to the accessory circuit, and a state in a case of listening to a sound of a car stereo while parking and the like. IGON is a state in which the power is supplied to the accessory circuit and the ignition circuit. When starting up the engine, the push switch 2 is operated while depressing the foot brake (not shown). The START relay 9 is driven by the power supply transition unit 4 only in this case. The engine starts up when the push switch 2 is operated while depressing the foot brake (not shown) regardless of the state of the power supply, and the power supply transitions to the IGON state. If the push switch 2 is operated without depressing the brake, only the power supply state transitions. The foot brake switch signal of FIG. 1 is a signal therefor (signal indicating depressing operation of foot brake).

Organizing and classifying the transition states according to the intention of the driver, the transition state of the LOCK, the ACC, and the IGON (START) can be divided into a first flow "LOCK→ACC→IGON (START)" intending the use of the power supply and a second flow "IGON→LOCK" intending the stop of the engine. Other than such two flows, other flows such as IGON→ACC are known, but will not be given for simplification and the two flows (first flow and second flow) will be described herein.

Viewing the startup of the engine as "upstream" for the sake of convenience, the first flow can be expressed as "up" and the second flow can be expressed as "down", which expression will be used in the present specification. That is, "LOCK→ACC→IGON" is referred to as "up" and "IGON→LOCK" is referred to as "down".

The order of "up" and "down" corresponds to "predetermined order" described in the summary of the invention, where the driving order of the IGON relay 8 becomes the last of the predetermined order in "up" and the driving order of the LOCK relay 6 becomes the last of the predetermined order in "down". Other modes include an order of "IGON→ACC→LOCK" in "down". In such case as well, the last of the predetermined order is to drive the LOCK relay 6.

Figure 3:
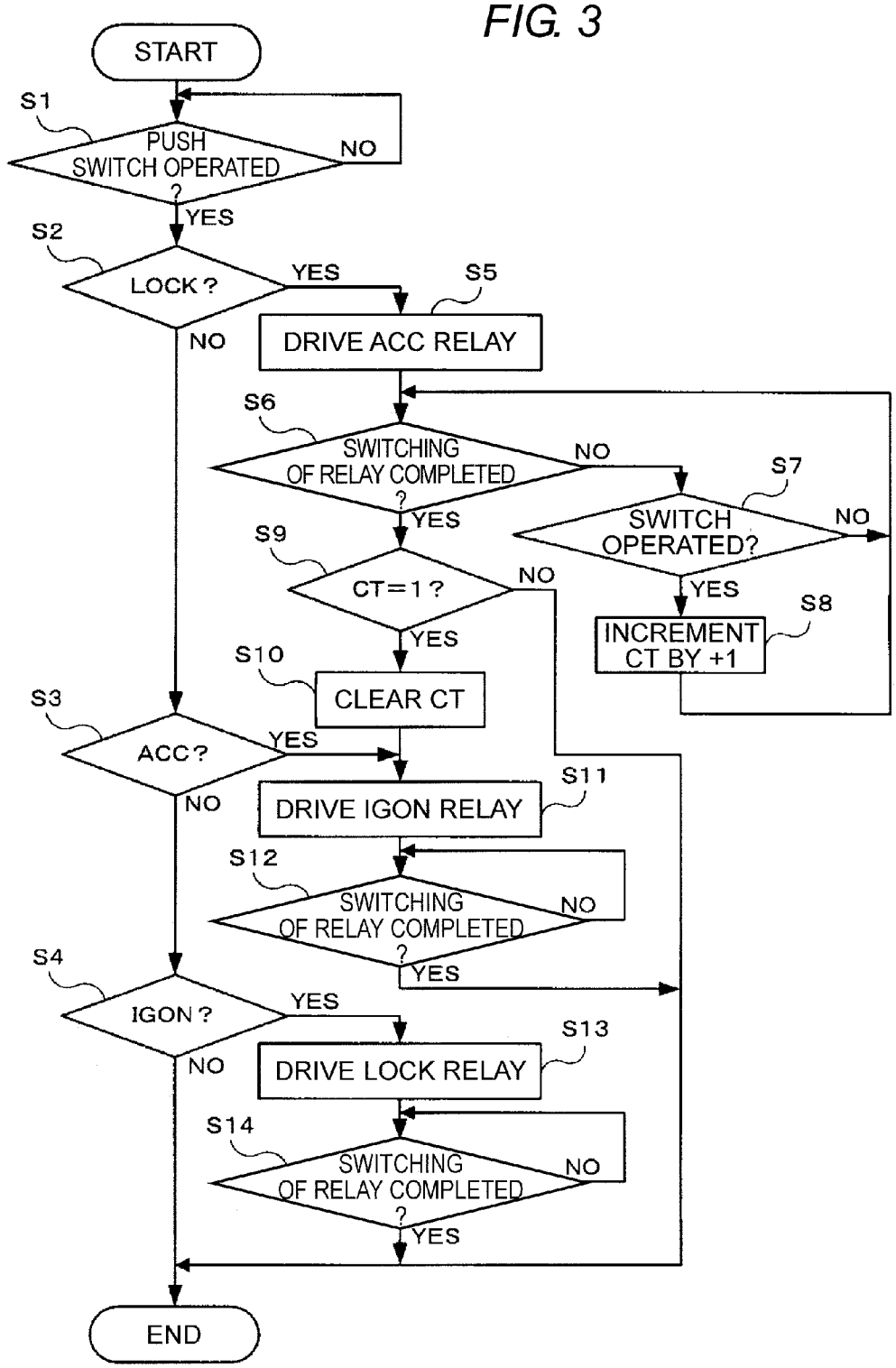
FIG. 3 is a view showing a schematic flow of a control program in one or more embodiments of the present invention.

FIG. 3 is a view showing a schematic flow of a control program according to one or more embodiments of the present invention. This control program is periodically executed in the control unit 5. In the control program, the presence of operation of the push switch 2 is first determined from the change of the push signal retrieved through the signal input unit 3 (step S1). If the push switch 2 is not operated, the process waits (repeat step S1), and if the push switch 2 is operated, whether or not the current transition state is "LOCK" is determined (step S2), where if the current transition state is "LOCK", a drive signal is output from the power supply transition unit 4 to the ACC relay 7 based on a command from the control unit 5 to instruct transition to the "ACC", to thereby drive the ACC relay 7 (step S5).

Although the illustration is not given, if determined that the push switch 2 is operated in step S1, a known authentication process is executed at the same time. In other words, if determined that the push switch 2 is operated in step S1, the wireless authentication is performed between the portable device 14 and the authentication unit 16, where if the authentication result ID matches, step S5 is executed to transition to the "ACC", and if not, the transition to the "ACC" is passed and the program is terminated.

The authentication method is not limited to the above illustration. For instance, in another authentication method, the authentication of the portable device 14 may be terminated when the driver gets into the vehicle compartment. In such method, an ID request signal is transmitted when the open/close of the door is detected by the authentication unit 16, and the ID contained in a response signal from the portable device 14 is matched.

When the ACC relay 7 is driven in step S5, whether or not the ACC relay 7 is switched from the OFF state (non-driven state) to the ON state (driven state), that is, whether or not the switching of the ACC relay 7 is completed is determined (step S6). If determined as not yet switched, whether or not the push switch 2 is operated is again determined (step S7). If determined that the push switch 2 is operated, a counter (hereinafter abbreviated as CT) is incremented by +1 (step S8), and then the process returns to step S6, where step S6 and step S7 are repeated until the switching of the ACC relay 7 is completed. Whether or not the driver has again operated the push switch 2 before the switching of the relay is completed thus can be known.

If determined that the switching of the ACC relay 7 is completed in step S6, the process proceeds to step S9, and whether or not the CT is set (CT=1) is determined. If determined as set, the process proceeds to step S10 and the CT is cleared.

A command for driving the IGON relay 8 is then transmitted from the control unit 5 to the power supply transition unit 4 in step S11, and the power supply transition unit 4 makes an output for driving the IGON relay 8.

The process then proceeds to step S12, and whether or not the switching of the IGON relay 8 is completed is determined. If determined that the switching of the IGON relay 8 is completed, the program is terminated, where the program is also terminated if determined that the CT is not set in step S9.

The process in a case where the push switch 2 is pushed while the current power supply transition state is the ACC will be described below.

If determined that the push switch 2 is operated in step S1, the process proceeds to step S2, and whether or not the current power supply transition state is the LOCK state is determined, where the process proceeds to step S3 to determine whether or not the current power supply transition state is the ACC state if determined as not the LOCK state.

If determined that the current power supply transition state is the ACC, the process proceeds to step S11, and a command output is made from the control unit 5 to the power supply transition unit 4 to drive the IGON relay 8. The power supply transition unit 4 makes an output to drive the IGON relay 8 according to such command. The process then proceeds to step S12 to determine whether or not the switching of the IGON relay 8 is completed, where the program is terminated if determined that the switching of the IGON relay 8 is completed.

The process in a case where the push switch 2 is pushed while the current power supply transition state is the IGON will be described below.

If determined that the push switch 2 is operated in step S1, the process proceeds to step S2, and whether or not the current power supply transition state is the LOCK state is determined. If determined as not the LOCK state, the process proceeds to step S3 to determine whether or not the current power supply transition state is the ACC state. If determined that the current power supply transition state is not the ACC, the process proceeds to step S4 to determine whether or not the IGON state.

If determined as the IGON state in step S4, the process proceeds to step S13, and a command output is made from the control unit 5 to the power supply transition unit 4 to drive the LOCK relay 6. The power supply transition unit 4 makes an output to drive the LOCK relay 6 according to such command. The process for non-driving the ACC relay 7 and the IGON relay 8 is simultaneously performed. The process then proceeds to step S14 to determine whether or not the switching of the LOCK relay 6 is completed, where the program is terminated if determined that the switching of the LOCK relay 6 is completed.

The detailed flow of the control program has been described above, but description will now be made by assuming a specific situation to facilitate the understanding.

(First situation) When the push switch 2 is operated while the engine is operating:

In this situation, the transitioning destination from the current transition state ("IGON") is only one of "down" ("LOCK") since the engine is in operation. Therefore, after determined that the current transition state is "IGON" in step S4, the state simply transitions to "LOCK" (step S13).

In the case of the first situation, the number of operations of the push switch 2 is not relevant. At least one operation needs to be made. This is because the process does not return to a determination on the operation of the push switch 2 of step S1 until the switching of the LOCK relay 6 is completed by executing step S14 after step S13, where even if the operation is made over plural times, the number of operations can be ignored. That is, the "down" process (process of step S13 and step S14) is executed only once regardless of the number of operations of the push switch 2. Therefore, even if the push switch 2 is operated over plural times, the involuntary inverted transition from "down" to "up" does not occur, and the operation that goes against the intention of the driver such as transitioning again to "ACC" and "IGON" after transitioning to "LOCK" does not occur.

(Second situation) When the push switch 2 is operated while the engine is stopped:

In this situation, the current transition state is one of "LOCK", "ACC", or "IGON" since the engine is stopped. The transitioning destination is related to the current transition state, but is one of "ACC", "IGON" or "LOCK" and the transitioning destination depends on the number of operations of the push switch 2 performed by the driver.

For instance, when the push switch 2 is operated while the current transition state is "LOCK", the transitioning destination intended by the driver is "ACC" or "IGON".

First, a case in which the current transition state is "LOCK" and the number of operations of the push switch 2 is "1" will be considered. In this case, step S8 is not executed, and "1" is not set to the CT. "CT=1?" is merely determined in step S9 after the ACC relay 7 is driven in step S5. Since the CT in this case is not "1", a determination result of step S9 is NO, and the program is directly terminated as a result. Furthermore, even if a time lag is generated before the switching of the ACC relay 7 is completed, a determination result of step S7 remains NO since the number of operations of the push switch 2 by the driver is "1", and the loop of step S6→step S7→step S6 is merely repeated during the time lag. Eventually, "CT=1?" is simply determined in step S9 with the completion of the switching of the ACC relay 7. Since the CT is not "1" in this case as well, the determination result of step S9 is NO, and the program is directly terminated as a result, which is no different from above.

In this case, therefore, the transition state changes from "LOCK" to "ACC", and the transition state intended by the driver is achieved.

A case in which the current transition state is "LOCK" and the push switch 2 is operated before the transition state switches to the "ACC" will now be considered. After the transition to the ACC is instructed in step S5 and "CT=1" is set in step S8, "CT=1?" is determined in step S9. In this case, CT=1, and thus the determination result of step S9 is YES, and the process proceeds to step S11 to instruct the transition to the IGON, and thereafter, whether or not the switching of the IGON relay is completed is determined in step S12, and the program is terminated.

In this case, therefore, the transition state changes from "LOCK" to "ACC" and further changes to "IGON", whereby the transition state intended by the driver is achieved.

A case in which the current transition state is ACC" and the number of operations of the push switch 2 is "1" will now be considered. In this case, a determination result of step S3 is YES, and the transition to the IGON is instructed in step S11, and thereafter, whether or not the switching of the IGON relay is completed is determined in step S12, and the program is terminated.

In this case, therefore, the transition state changes from "ACC" to "IGON", whereby the transition state intended by the driver is achieved.

A case in which the number of operations of the push switch 2 is mistaken and the push switch 2 is pushed by greater number of times will now be considered. A case in which the current transition state is "LOCK" and the push switch 2 is pushed "three" times exceeding the correct number (2) although the transitioning destination intended by the driver is "IGON" will be described.

In such case, an involuntary transition (inverted transition from up to down) from "IGON" to "LOCK" does not occur in the illustrated control program. This is because the program is terminated after driving the ACC relay 7 in step S5 and then driving the IGON relay 8 in step S11, and transition is not made from the IGON state to the LOCK state, that is, the number of operations exceeding "two" of the push switch 2 is ignored.

Considering a case in which the current transition state is "ACC" and the push switch 2 is pushed "two" times exceeding the correct number (1) although the transitioning destination intended by the driver is "IGON", the state does not proceed to the next power supply transition since the step of performing a check on the presence of the operation of the push switch 2 is not performed after the instruction to transition to "IGON" is made in step S11. Therefore, in this case as well, an involuntary transition (inverted transition from up to down) from "IGON" to "LOCK" does not occur.

Therefore, according to one or more embodiments of the present invention, an automobile power supply control device capable of appropriately performing the power supply transition closer to the intention of the driver can be provided.

FIGS. 4A and 4B are conceptual explanatory views according to one or more embodiments of the present invention. The figure shows a relationship between the operation of the push switch 2, and the change in state of a plurality of power supply transition elements (see LOCK relay 6, ACC relay 7, IGON relay 8, and START relay 9 of FIG. 1) involved in the operation.

First, describing with reference to FIG. 4A, it is assumed that the push switch 2 is operated three times at a predetermined interval T along a time axis from the LOCK state. P1 to P3 show the respective operation. In FIG. 4A, if the predetermined interval T is a time sufficiently greater than the time lag (switching time of relay in the figure) of the power supply transition element, the relay switching indicated by symbol (a) is performed in response to P1, the relay switching indicated by symbol (b) is performed in response to subsequent P2, and thereafter, the relay switching indicated by symbol (c) is performed in response to subsequent P3. Therefore, in this case, (P1→P2→P3), the power supply transition of LOCK→ACC→IGON is performed with no difficulty.

It is assumed that a mistaken switch operation (symbol P4) is performed at the time point of smaller than or equal to the predetermined interval T in FIG. 4A. However, involuntary inverted transition (IGON→LOCK) does not occur since the operation input of P4 is ignored in control. This is because after the instruction to transition to the "LOCK" state is made in step S13, step S14 is looped until the switching of the LOCK relay 6 is completed in the flow of FIG. 3, where even if a mistaken switch operation (symbol P4) is performed at the time point of smaller than or equal to the predetermined interval T after P3, such switch operation (P4) is ignored by the relevant loop.

Description will now be made with reference to FIG. 4B. In FIG. 4B, an example in which the push switch 2 is operated three times (P11, P12, P13) at a short interval of smaller than or equal to the predetermined interval T, and thereafter, the push switch 2 is again operated two times (P14, P15) at a short interval of smaller than or equal to the predetermined interval T after a time greatly exceeding the predetermined interval T is shown. In summary, the transition to the ACC state is made based on the operation of P11, the transition to the IGON state is made based on the operation of P12, the operation of P13 is discarded, the transition to the LOCK state is made based on the operation of P14, and the operation of P15 is discarded by the action of the flow of FIG. 3 in this case, whereby the power supply transition of LOCK→ACC→IGON is performed with no difficulty and an involuntary power transition of IGON→LOCK→ACC does not occur although the push switch 2 is operated more than necessary.

<P13→Discard>

The reason the operation of P13 is discarded is because only the first time of the operations (P12 and P13) of the push switch 2 during the switching of the ACC relay 7 is effective. That is, although "CT=1" (step S8) in both P12 and P13, the value of CT is merely the same "+1" in P12 and P13, and the determination result of step S9 becomes YES simultaneously with the completion of the switching of the ACC relay 7 as a result, so that after "clear CT" in step S10, the instruction to transition to the "IGON" state is merely made in step S11. Therefore, even if the push switch 2 is operated a number of times during the switching of the ACC relay 7, the number of operations is assumed as one time (two or more times are ignored: P13 is ignored in P12 and P13 of the above example) and the instruction to transition to the IGON state is performed with no trouble according to the considered number of times (one time).

<P15→Discard>

The reason the operation of P15 is discarded is because the operation of the push switch 2 during the switching of the LOCK relay 6 is ignored. That is, after making the instruction to transition to the LOCK state in step S13 in response to P14, step S14 is looped until the switching of the LOCK relay 6 is completed, and P15 is ignored as it occurs during such loop. Therefore, even if the push switch 2 is operated a number of times during the switching of the LOCK relay 6, all such operations are ignored, and an involuntary power supply transition from LOCK to ACC does not occur.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An automobile power supply control device for performing a control of switching a plurality of power supply circuits of a vehicle based on an operation of a push button type operation switch, the automobile power supply control device comprising:
    a plurality of switching units that connect the power supply circuits and a vehicle battery; and
    a control unit that controls driving of the switching units in a predetermined order according to a number of operations of the operation switch;
    wherein the control unit comprises:
        a first detecting portion that detects the operation of the operation switch;
        an output portion that outputs a drive command for driving the switching unit of next order when the first detecting portion detects the operation of the operation switch; and
        a second detecting portion that detects the number of operations of the operation switch from a time point the drive command is output until a contact of the driven switching unit is switched;
    wherein the switching units are driven in order by the number of operations detected by the second detecting portion,
    wherein driving is terminated when a last switching unit of the predetermined order is driven, or terminated when a first switching unit of the predetermined order is driven, and
    wherein, after the last switching unit or the first switching unit is driven, the control unit terminates driving of the switching units in the predetermined order regardless of the number of operations detected by the second detecting portion.

2. A method of performing a control of switching a plurality of power supply circuits of a vehicle based on an operation of a push button type operation switch, the method comprising:
    driving a plurality of switching units to connect the power supply circuits and a vehicle battery; and
    controlling the driving of the switching units in a predetermined order according to a number of operations of the operation switch;
    wherein controlling the driving of the switching units comprises:
        detecting of the operation of the operation switch;
        outputting a drive command for driving the switching unit of next order when the operation of the operation switch is detected; and
        detecting of the number of operations of the operation switch from a time point the drive command is output until a contact of the driven switching unit is switched;
    wherein the switching units are driven in order by the number of operations detected,
    wherein driving is terminated when a last switching unit of the predetermined order is driven, or terminated when a first switching unit of the predetermined order is driven, and
    wherein, after the last switching unit or the first switching unit is driven, driving of the switching units in the predetermined order is terminated regardless of the detected number of operations.

* * * * *